United States Patent [19]

Sasaki et al.

[11] Patent Number: 5,280,076
[45] Date of Patent: Jan. 18, 1994

[54] CORE-SHELL POLYMER AND ITS USE

[75] Inventors: Ichiro Sasaki, Suita; Takao Teraoka, Akashi; Junji Oshima, Toyonaka, all of Japan

[73] Assignee: Takeda Chemical Industries, Ltd., Osaka, Japan

[21] Appl. No.: 763,167

[22] Filed: Sep. 20, 1991

[30] Foreign Application Priority Data

Sep. 21, 1990 [JP] Japan ................... 2-253794

[51] Int. Cl.$^5$ .................... C08F 265/06; C08L 59/02
[52] U.S. Cl. ...................... 525/310; 523/201; 524/504; 525/261; 525/309; 525/902
[58] Field of Search ............... 525/902, 67, 261, 309, 525/310; 523/201; 524/504

[56] References Cited

U.S. PATENT DOCUMENTS

| | | | |
|---|---|---|---|
| 3,632,466 | 1/1972 | Peaker | 524/417 |
| 3,749,755 | 7/1973 | Bronstert | 260/876 R |
| 3,862,913 | 1/1975 | Sturt | 260/17 |
| 4,639,488 | 1/1987 | Schuette et al. | 525/64 |
| 4,713,414 | 12/1987 | Busumgar | 525/64 |
| 4,804,716 | 2/1989 | Flexman, Jr. | 525/399 |
| 5,039,741 | 8/1991 | Burg et al. | 525/64 |

FOREIGN PATENT DOCUMENTS

| | | |
|---|---|---|
| 0115373 | 8/1984 | European Pat. Off. . |
| 0156285 | 10/1985 | European Pat. Off. . |
| 0390146 | 10/1990 | European Pat. Off. . |
| 2078738 | 11/1971 | France . |
| 4734832 | 6/1982 | Japan . |
| 59-15331 | 4/1984 | Japan . |
| 1330056 | 9/1973 | United Kingdom . |

*Primary Examiner*—Paul R. Michl
*Assistant Examiner*—Olga Asinovsky
*Attorney, Agent, or Firm*—Wenderoth, Lind & Ponack

[57] ABSTRACT

The present invention relates to a core-shell polymer which is useful for polyoxymethylene resin, a polyoxymethylene resin composition containing the core-shell polymer and a molded article made of the polyoxymethylene resin.

The core-shell polymer is produced by an emulsion polymerization reaction using an oligomeric surfactant and a neutral radicals-liberating polymerization initiator.

This core-shell polymer makes the molded article be improved on the impact strength, elongation at the weld line, weatherability, thermal stability, etc., and the molded articles is used as various products.

1 Claim, No Drawings

CORE-SHELL POLYMER AND ITS USE

The present invention relates to a core-shell polymer and a resin composition insuring high impact strength and improved weld characteristics as produced by melt-blending said core-shell polymer.

BACKGROUND OF THE INVENTION

Polyoxymethylene (POM) resin has been employed as a molding material in the manufacture of various parts such as gears, reels, cord clips, etc. but because these moldings are not good enough in impact strength, many attempts have been made to improve POM resin in this quality parameter.

However, because of the very structure of POM resin, no blending resin is available that is sufficiently compatible with POM resin.

Furthermore, because of the high crystallinity of POM resin, any improvement in its physical properties that may be obtained by alloying with other resins compromises its weld strength and elongation.

Moreover, because of its inadequate thermal stability, POM resin is not suited for high-temperature blending.

Heretofore a number of core-shell polymers have been proposed for melt-blending for the purpose of improving the impact strength of matrix resins. Any core-shell polymer consisting of a rubbery elastomer core and a glassy polymer shell, in particular, has the advantage of greater reproducibility of dispersion uniformity because the state of its dispersion in a matrix resin is less susceptible to the influence of melt-blending conditions.

Such core-shell polymers have heretofore been used as impact modifier for a variety of matrix resins such as polycarbonate, poly(butylene terephthalate), polyamide, poly(phenylene oxide), etc. as well as various alloys thereof.

However, the core-shell polymers heretofore available contain ingredients that encourage thermal degradation of POM resin. Therefore, these known core-shell polymers can hardly be even blended with POM resin. If they could be blended, the resulting compositions would be inadequate in thermal stability.

A POM resin composition with improved impact strength is disclosed in U.S. Pat. No. 4,804,716, for instance. This is a POM resin composition forming thermoplastic IPN (interpenetrated polymer networks) with a polyurethane elastomer but has many disadvantages. Thus, in order to obtain a sufficiently high impact strength, it is necessary to use the polyurethane elastomer in a fairly large proportion so that the modulus of elasticity is markedly sacrificed. Moreover, it is impossible to obtain a composition having satisfactory thermal stability, weatherability, fluidity and weld strength and elongation characteristics.

European Patent Laid-open Publication No. 115,373 discloses a POM resin composition containing a rubbery elastomer prepared by emulsion-polymerization of $C_{1-8}$ alkyl acrylates. However, the production of this composition requires special blending conditions and if the ordinary blending conditions are used, a sufficiently stable POM resin composition cannot be obtained. Moreover, no ingenuity has been exercised in regard to thermal stability in the emulsion polymerization stage.

U.S. Pat. No. 4,713,414 discloses a POM resin composition containing a core-shell polymer and a reactive titanate. However, even with this core-shell polymer, the POM resin composition is unstable, undergoing decomposition.

Particularly the core-shell polymer used in the examples described in U.S. Pat. No. 4,713,414 and EP-A-115,373 is deficient in thermal stability (Comparative Example 1 of this specification).

Disclosed in U.S. Pat. No. 4,639,488 is a POM resin composition containing a rubbery elastomer obtained by emulsion polymerization of butadiene but here is no exercise of ingenuity in the emulsion polymer, either, and the thermal stability of this composition is poor.

U.S. Pat. No. 3,749,755 discloses a POM resin composition containing a rubbery elastomer but its thermal stability is unsatisfactory.

Japanese Patent Examined No. 15331/1984 discloses a method for producing a thermoplastic resin like acrylonitrile-acrylate-styrene (AAS resin) using emulsion polymerization technique improved on impact strength. This is, however, copolymer not a blend mixture.

It is generally acknowledged that a polymer blend composed of crystalline polymers is insufficient in the strength and elongation of welds. For example, a POM resin composition containing a poly urethane elastomer as a blending resin for improved impact strength is markedly compromised in weld strength and elongation.

Moreover, among engineering plastics, POM resin does not necessarily rank high in weatherability. When blended with a poly urethane elastomer for improved impact strength, POM resin provides only a composition markedly compromised in weatherability.

In the above state of the art, therefore, development of an impact modifier which, in a POM resin composition, provides sufficient impact strength and insures sufficient weld strength and elongation as well as improved thermal stability has been keenly demanded.

Moreover, POM resin is particularly poor in weatherability among various engineering plastics. This parameter has not been overtly improved by the prior art mentioned above and, therefore, development of a POM resin composition improved not only in impact strength but also in weatherability has been demanded.

The inventors of the present invention explored this field of art to develop a core-shell polymer capable of providing an improved POM resin composition and found that the surfactant and polymerization initiator used in the preparation of the core-shell polymer has had adverse effects on the thermal stability of POM resin. Based on this finding, attempts were made to improve the weld strength and elongation and weatherability of POM resin, and it was ultimately discovered that the above-mentioned problems can be solved all at once by melt-blending a core-shell polymer of the construction described hereinafter. The present invention is predicated on the above findings.

DETAILED DESCRIPTION OF THE INVENTION

The present invention is therefore directed to a core-shell polymer comprising a rubbery polymer core and a glassy polymer shell as produced by emulsion-polymerization in the presence of an oligomeric surfactant and a neutral radicals-liberating polymerization initiator, a polyoxymethylene resin composition containing said core-shell polymer, and a resin product molded from said composition.

In accordance with the present invention, an emulsion polymerization is carried out using the following surfactant and initiator.

The surfactant to be used in the present invention is an oligomeric surfactant such as those which have been used in emulsion polymerization reactions for certain special purposes. For example, oligomeric surfactants of the following formula can be employed.

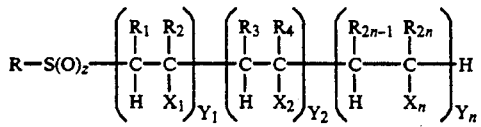

In the above formula, R means an alkyl group of 5 to 20 carbon atoms, preferably 6 to 12 carbon atoms; Z is equal to 0, 1 or 2; preferably 0 or 1, and more preferably 0; n is a positive integral number; $R_{2n-1}$ respectively means —H, —$CH_3$, —$C_2H_5$ or —COOH; $R_{2n}$ respectively means —H, —$CH_3$, —$C_2H_5$, —COOH or —$CH_2COOH$; $X_n$ means —COOH, —$CONH_2$, —$OCH_3$, —$OC_2H_5$, —$CH_2OH$,

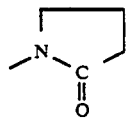

—$CONH_2$, —$COOC_2H_4OH$, —$COOC_3H_6OH$, —$CONHCH_2OH$, —$CONHCH_3$, —$CONHC_2H_5$, —$CONHC_3H_7$, —$COOCH_3$, —$COOC_2H_5$, —CN, —$OCOCH_3$, —$OCOC_2H_5$, or

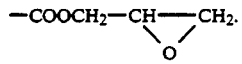

The molecular weight of the oligomeric surfactant to be used in accordance with the invention is about 200 to 5000, preferably about 1500 to 3000, with the degree of polymerization

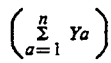

ranging from about 6 to 50.

The oligomeric surfactant as such may be water-soluble. If not, it is converted to a water-soluble salt by reacting with an oxide, hydroxide or alcohol.

The water-soluble salt mentioned just above includes, among others, alkali metal salts, alkaline earth metal salts, Group III heavy metal salts, ammonium salt, substituted ammonium salts, etc., and most preferably the ammonium salt.

These oligomeric surfactants can be synthesized, for example as described in Japanese Patent Publication No. 47-34832, by addition-polymerizing relevant monomers in an anhydrous solvent in the presence of an alkyl mercaptan or further oxidizing the oligomer with hydrogen peroxide or ozone to the corresponding sulfoxide or sulfone.

The alkyl mercaptan mentioned above includes, among others, n-octyl mercaptan, n-dodecyl mercaptan, t-dodecylmercaptan, n-decyl mercaptan and so on.

The monomers mentioned above include $\alpha,\beta$-ethylenically unsaturated monomers having at least one polar group, such as (meth)acrylic acid, $\alpha$-ethyl acrylate, $\beta$-methyl acrylate, $\alpha,\beta$-dimethyl acrylate, caproic acid, itaconic acid, fumaric acid, maleic acid, (meth)acrylamide, vinyl ethyl ether, vinyl methyl ether, allyl alcohol, vinylpyrrolidone, (meth)acrylonitrile, ethylacrylonitrile, methyl (meth)acrylate, ethyl acrylate, hydroxyethyl (meth)acrylate, hydroxypropyl (meth)acrylate, vinyl acetate, vinyl propionate, N-isoproylacrylamide, N-ethylacrylamide, N-methylacrylamide, glycidyl (meth) acrylate, N-methylolacrylamide and so on.

The solvent used for the above-mentioned addition polymerization is preferably a lower alkanol such as methanol, ethanol, isopropyl alcohol and so on.

The above addition polymerization is generally carried out in the temperature range of about 20° to 100° C.

The proportion of said oligomeric surfactant in the practice of the present invention is selected with reference to the particle stabilizing power of the surfactant.

In the present invention oligomeric anionic surfactant is used preferably.

The neutral radicals-liberating polymerization initiator includes initiators of the azo type, such as azobis (isobutyronitrile), dimethyl 2,2'-azobis (isobutyrate), 2,2'-azobis (2-amidinopropane) dihydrochloride, etc. and peroxides such as cumene hydroperoxide, diisopropylbenzene hydroperoxide, hydrogen peroxide and so on. These initiators can be used independently or in combination.

The emulsion polymerization in a reaction system containing said oligomeric surfactant and initiator gives rise to a core-shell polymer which is substantially free of sulfur oxide compounds or lean in sulfur oxide compounds.

The low sulfur oxide compound (e.g. sulfate, persulfate, etc.) content means that the result of an ordinary qualitative test for sulfate ions is negative.

A typical test is as follows. Five grams of a sample (core-shell polymer) is weighed into a 50 ml conical flask, 20 ml of deionized water is added and the mixture is stirred with a magnetic stirrer for 3 hours at room temperature.

The mixture is then filtered through a No. 5 C filter paper and the filtrate is divided into halves. To one of the halves is added 0.5 ml of 1% barium chloride aqueous solution and the relative turbidity of the halves is evaluated (qualitative test for sulfate ion).

The impact strength of a POM resin composition containing such a core-shell polymer, particularly one free of sulfur oxide compounds, is very excellent.

The core-shell polymer according to the present invention can be produced by the so-called seeded emulsion polymerization method, which is a serial multistage emulsion polymerization method in which a polymer formed in the preceding stage is covered with a polymer formed in the following stage.

It is preferable that in the seed particle-forming stage, the monomer, surfactant and water be fed to the reactor and, then, the initiator be added so as to initiate the emulsion polymerization reaction.

The first-stage polymerization is the reaction forming a rubbery polymer.

The monomer for constituting such rubber polymer includes, among others, conjugated dienes and alkyl acrylates containing 2 to 8 carbon atoms in the alkyl moiety, as well as mixtures thereof.

Such a monomer or monomers is polymerized to give a rubbery polymer with a glass transition temperature of not higher than −30° C.

Among said conjugated dienes can be reckoned butadiene, isoprene, chloroprene and so on, although butadiene is particularly preferred.

Among said alkyl acrylates whose alkyl moieties contain 2 to 8 carbon atoms each are ethyl acrylate, propyl acrylate, butyl acrylate, cyclohexyl acrylate, 2-ethylhexyl acrylate and so on, although butyl acrylate is particularly desirable.

In this first-stage polymerization reaction, monomers copolymerizable with said conjugated dienes and/or alkyl acrylates can be copolymerized. Among such monomers can be reckoned various aromatic vinyl or vinylidene compounds such as styrene, vinyltoluene, α-methylstyrene, etc., vinyl or vinylidene cyanide compounds such as acrylonitrile, methacrylonitrile, etc., and alkyl methacrylates such as methyl methacrylate, butyl methacrylate and so on.

When the first-stage polymerization system does not contain a conjugated diene or, if it does, in a proportion of not more than 20 weight % of the total monomer for the first-stage reaction, an improved impact strength can be implemented by incorporating a crosslinking monomer and a grafting monomer in small proportions. The crosslinking monomer mentioned above includes, among others, aromatic divinyl monomers such as divinylbenzene etc., and alkane polyol polyacrylates or polymethacrylates such as ethylene glycol diacrylate, ethylene glycol dimethacrylate, butylene glycol diacrylate, hexanediol diacrylate, hexanediol dimethacrylate, oligoethylene glycol diacrylate, olioethylene glycol dimethacrylate, trimethylolpropane diacrylate, trimethylolpropane dimethacrylate, trimethylolpropane triacrylate, trimethylolpropane trimethacrylate and so on. Particularly preferred are butylene glycol diacrylate and hexanediol diacrylate.

The grafting monomer includes, among others, allyl esters of unsaturated carboxylic acids, such as allyl acrylate, allyl methacrylate, diallyl maleate, diallyl fumarate, diallyl itaconate and so on, although allyl methacrylate is particularly preferred.

The above crosslinking monomer and grafting monomer are used in a proportion of 0.01 to 5 weight % each, preferably 0.1 to 2 weight % each, based on the total monomer for the first-stage polymerization reaction.

The rubbery polymer core preferably accounts for 50 to 90 weight % of the total core-shell polymer. If the proportion of the core is either below or above the above-mentioned range, the resin composition prepared by melt-blending the core-shell polymer may not be improved well in impact strength.

Moreover, the low-temperature impact strength may not be adequately improved if the glass transition temperature of the core is higher than −30° C.

The outer phase of the core-shell polymer is constituted by a glassy polymer.

As examples of the monomer constituting the glassy polymer, there may be mentioned methyl methacrylate and various monomers copolymerizable with methyl methacrylate.

This monomer is either methyl methacrylate as such or a mixture of methyl methacrylate and one or more other monomers copolymerizable with methyl methacrylate, and forms a glassy polymer with a glass transition temperature of not lower than 60° C.

The monomers copolymerizable with methyl methacrylate include various vinyl polymerizable monomers, e.g. alkyl acrylates such as ethyl acrylate, butyl acrylate, etc., alkyl methacrylates such as ethyl methacrylate, butyl methacrylate, etc., aromatic vinyl or vinylidene compounds such as styrene, vinyltoluene, α-methylstyrene, etc., and vinyl or vinylidene cyanides such as acrylonitrile, methacrylonitrile and so on. Particularly preferred are ethyl acrylate, styrene and acrylonitrile.

This outer shell phase preferably accounts for 10 to 50 weight % of the total core-shell polymer. If the proportion of the shell phase is below or above the above-mentioned range, the resin composition prepared by melt-blending the core-shell polymer may not be improved sufficiently in impact strength.

An intermediate phase may be interposed between the first-stage polymer phase and the final-stage polymer phase. Such an intermediate phase can be provided by subjecting a polymerizable monomer having functional groups, such as glycidyl methacrylate, unsaturated carboxylic acids, etc., a polymerizable monomer forming a glassy polymer such as methyl methacrylate, or a polymerizable monomer forming a rubbery polymer such as butyl acrylate.

A variety of intermediate phases can be selected according to the desired properties of the core-shell polymer.

The polymerizing proportions may be appropriately chosen according to the monomers used. For example, when a glassy polymer is to be used as the intermediate phase, its polymerizing ratio can be calculated assuming this phase as a part of the shell and when the intermediate phase is a rubbery polymer, its ratio can be calculated as a part of the core.

The structure of a core-shell polymer having such an intermediate phase may, for example, be a multi-layer system including an additional layer between a core and a shell or a salami-like system in which an intermediate layer is dispersed as small particles in the core. In a core-shell polymer of the salami type, the intermediate phase which is usually dispersed may form a new core in the center of the core polymer. Such a core-shell polymer is sometimes formed when styrene or the like is used as the monomer for constituting the intermediate phase.

The use of such a core-shell polymer having an intermediate phase results not only in improvements in impact strength but also improved flexural modulus, increased heat distortion temperature and improved appearance (molding delamination and pearlescence, variation of color due to change in refractive index).

The core-shell polymer of the present invention can be made available in the form of granules, flakes or powders, for example by the following procedures.

(1) A latex is produced by the per se known seeded emulsion polymerization method in the presence of said surfactant and initiator.

(2) This latex is then subjected to the freeze-thaw cycle to separate the polymer.

(3) Then, the polymer is dehydrated centrifugally and dried.

By the above recovery procedure, the solvent and surfactant used in the emulsion polymerization can be largely removed.

Alternatively, at step (2) above, the latex as it is may be dried and used.

The spray-drying method using a spray drier can also be utilized for recovery of the core-shell polymer from the latex.

The core-shell polymer thus isolated may be processed into pellets by means of an extruder or pelletizer or be directly melt-blended with matrix resin for achieving improved impact strength.

The POM resin composition of the present invention contains 5 to 100 weight parts, preferably 10 to 80 weight parts, of said core-shell polymer based on 100 weight parts of POM resin.

If the proportion of the core-shell polymer is less than 5 weight parts, no improvement may be realized in impact strength, while the use of the core-shell polymer in excess of 100 weight parts may result in marked decreases in the rigidity and thermal properties of the product resin.

The POM resin which can be used in the present invention may be a homopolymer of formaldehyde or a copolymer of formaldehyde or a cyclic oligomer thereof with an alkylene oxide containing at least 2 geminal carbon atoms in the backbone chain and any of such polyoxymethylene homopolymer resins and polyoxymethylene copolymer resins can be employed.

In the production of a POM resin composition according to the present invention, the melt-blending method is employed.

Melt-blending is generally performed in an appropriate temperature range between 180° C. and 240° C., where the resins melt and the viscosity of the composition will not be too low.

The melt-blending operation can be performed using a calender, Banbury mixer or a single-screw or multi-screw extruder.

The resin composition of the present invention may further contain various additives and other resins in appropriate proportions.

Among the additives mentioned above are flame retardants, mold releases, weather resistance agents, antioxidants, antistatic agents, heat resistance agents, colorants, reinforcements, surfactants, inorganic fillers, lubricants and so on.

The resin compositions of the invention may be molded into articles of desired shapes, by ordinary molding techniques such as injection molding, extrusion molding, compression molding and so on, at a temperature of 200°–300° C.

The core-shell polymer of the present invention, when melt-blended with POM resin, imparts an excellent impact strength.

Moreover, the resin composition containing the core-shell polymer of the invention is more thermally stable than the corresponding resin composition containing any of the known core-shell polymers and displays better fluidity, thermal stability, appearance, weatherability and weld strength and elongation than the resin composition containing a polyurethane elastomer.

EXAMPLES

The following working examples and reference example are intended to illustrate the present invention in further detail and should by no means be construed as limiting the metes and bounds of the invention. It should be understood that, in the working and reference examples, all parts are by weight. The following abbreviations are used in the examples.

| | |
|---|---|
| Styrene | St |
| Acrylonitrile | AN |
| Ethyl acrylate | EA |
| Methyl methacrylate | MMA |
| 2-Ethylhexyl acrylate | 2EHA |
| Butadiene | Bd |
| Butyl acrylate | BA |
| 1,4-Butylene glycol diacrylate | BGA |
| Allyl methacrylate | AlMA |
| Methacrylamide | MAM |
| Methacrylic acid | MAA |
| 2,2'-Azobis(isobutyronitrile) | AIBN |
| Deionized water | DIW |
| 2,2'-Azobis(2-amidinopropane) dihydrochloride (Wako Pure Chemicals, V50) | V50 |
| Hydrogen peroxide | $H_2O_2$ |
| Vitamin C (ascorbic acid) | VC |
| Sodium persulfate | SPS |
| Sodium octylsulfosuccinate (Neocol P, Dai-ichi Kogyo Seiyaku Co., Ltd.) | NP |
| OS soap (potassium oleate, Kao Corporation) | OS |
| Tetrasodium ethylenediaminetetraacetate | EDTA |
| Dodecyl mercaptan | DMP |
| Oligomeric surfactant | Surfactant A |

This surfactant was synthesized as in Example 13 described in Japanese Kokai Patent Application No. 53-10682, adjusted to pH 7.5 with aqueous ammonia and diluted with purified water to make a solid content of 10%.

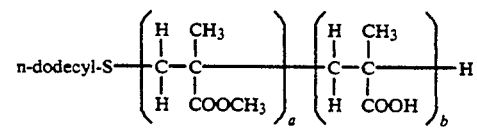

(wherein a:b = 7:3, a + b = 13.6

| [Composition] | |
|---|---|
| MAA | 155 g |
| MMA | 360 g |
| n-DMP | 109 g |
| AIBN | 4.4 g |
| Isopropyl alcohol | 314 g |
| Molecular weight 1310 | |
| Oligomeric surfactant | Surfactant B |

This surfactant was synthesized as follows;

A 7-liter polymerization reactor equipped with a reflux condenser was charged with 1550 g of isopropyl alcohol, 231 g of MMA, 546 g of MAA, 137 g of hydroxyethyl acrylate and 170 g of t-DMP, and the charge was heated to 60° C. with stirring in a nitrogen stream. Then, 21 g of AIBN was added to initiate a polymerization, and the internal temperature was increased to 75° C. The reaction mixture was cooled to not more than 40° C., then 2000 g of DIW was added thereto, and adjusted to pH 7.5 with aqueous ammonia. Isopropyl alcohol was distilled off under reduced pressure, and it was diluted with DIW to make a solid content of 10%.

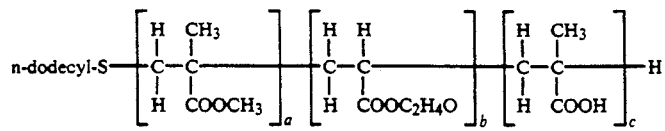

[wherein a:b:c: 47:24:129, a+b+c=39.3, Molecular weight 3500~4000])

EXAMPLE 1

Production of core-shell polymer A

A 7-liter autoclave was charged with 975 g of DIW, 1.47 g of 25% aqueous ammonia, 10.5 g of surfactant A, and 0.525 g of MAM and, after nitrogen purging, the internal temperature was increased to 70°. A seed monomer mixture of the following composition was then added and dispersed over 10 minutes, after which 10.5 g of a 10% aqueous solution of V50 was added for the formation of seed particles.

| Seed monomer mixture | |
| --- | --- |
| EA | 51.608 g |
| AlMA | 0.263 g |
| BGA | 0.105 g |

Then, 1168.8 g of DIW, 21 g of surfactant A, 4.2 g of 25% aqueous ammonia, 10.5 g of a 10% solution of EDTA, 0.525 g of t-DMP and 3.497 g of MAM were added and the temperature was increased to 70° C.

Then, 10.92 g of an initiator solution of the following composition was added to initiate the core polymerization.

| Initiator solution | |
| --- | --- |
| 10% V50 | 105.0 g |
| 25% Aqueous ammonia | 4.2 g |

Then, the following core monomer mixture and surfactant solution were continuously fed over a period of 240 minutes. The balance of the initiator solution was fed over 480 minutes. After completion of feed, the mixture was stirred for 12 hours to give a core latex.

| Core monomer mixture | |
| --- | --- |
| Bd | 420.00 g |
| 2EHA | 376.95 g |
| MMA | 195.30 g |
| Surfactant solution | |
| Surfactant A | 105.00 g |
| 5% Aqueous MAM | 35.07 g |

Shell polymerization was initiated by adding 14.5 g of the following initiator solution.

| Initiator solution | |
| --- | --- |
| 10% V50 | 13.5 g |
| 25% Aqueous ammonia | 0.9 g |

Thereafter, the following shell monomer emulsion was continuously fed over 120 minutes for further seeded polymerization.

| Shell monomer emulsion | |
| --- | --- |
| MMA | 404.1 g |
| EA | 45.0 g |
| BGA | 0.9 g |
| Surfactant A | 27.0 g |
| DIW | 630.0 g |
| 25% Aqueous ammonia | 0.54 g |

The temperature was increased to 90° C. and the reaction mixture was kept for 1 hour. After cooling, the mixture was filtered through a 300-mesh stainless steel screen to give a core-shell polymer latex.

This latex was frozen, filtered through a glass filter and dried in an air current at 40° C. for 24 hours to give core-shell polyer A.

EXAMPLE 2

Production of core-shell polymer B

A 5-liter polymerization reactor equipped with a reflux condenser was charged with 1200 g of DIW, 1.68 g of 25% aqueous ammonia, 7 g of surfactant A and 0.14 g of MAM and the charge was heated to 70° C. with stirring in a nitrogen stream. Then, 27.86 g of a seed monomer mixture of the following composition was added and dispersed over 10 minutes, followed by addition of 21 g of a 10% aqueous solution of V50 to initiate a seed polymerization.

| Seed monomer mixture | |
| --- | --- |
| EA | 27.664 g |
| AlMA | 0.14 g |
| BGA | 0.056 g |

After 7 g of MAM was added, a monomer emulsion prepared by adding 210 g of surfactant A, 900 g of DIW and 2.80 g of 25% aqueous ammonia to 1400 g of a core monomer mixture of the following composition and a mixture of 21.0 g of a 10% aqueous solution of V50 and 0.63 g of 1% aqueous ammonia were continuously fed over 180 minutes for further seeded polymerization.

| Core monomer mixture | |
| --- | --- |
| BA | 1215.2 g |
| MMA | 140.0 g |
| BGA | 2.8 g |
| AlMA | 7.0 g |

The reaction temperature was increased to 80° C. and kept for 1 hour and, then, cooled to 70° C.

After 9 g of a 10% aqueous solution of V50 and 0.27 g of 1% aqueous ammonia were added, the following shell monomer emulsion, 12 g of a 10% aqueous solution of V50 and 0.36 g of 1% aqueous ammonia were continuously fed over 60 minutes for further seeded polymerization.

| Shell monomer emulsion | |
| --- | --- |
| MMA | 540.0 g |
| EA | 60.0 g |
| Surfactant A | 30.0 g |
| DIW | 500.0 g |
| 25% Aqueous ammonia | 0.92 g |

The temperature was increased to 80° C., where the mixture was kept for 1 hour. After cooling, the reaction mixture was filtered through a 300-mesh stainless steel screen to give a core-shell polymer latex.

This latex was frozen at −15° C., filtered through a glass filter and dried in an air current at 60° C. for 24 hours to give core-shell polymer B.

EXAMPLE 3

Production of core-shell polymer C

According to the method of Example 1, core-shell polymer C. was produced using surfactant B instead of surfactant A.

EXAMPLE 4

Production of core-shell polymer D

A 2-liter polymerization vessel equipped with a reflux condenser was charged with 600 g of DIW and 20 g of surfactant B and the mixture was stirred under a nitrogen stream and heated to 35° C. 35 g of EA was added to the above mixture and dispersed for 10 minutes. 12 g of a 3% aqueous solution of $H_2O_2$ and 12 g of a 2% aqueous solution of VC were added for polymerization of seed latex. 665 g of a core monomer mixture of the under-mentioned composition was mixed with 135 g of surfactant B and 95 g of DIW. Then, the mixture was fed to the reaction mixture over a period of 240 minutes, followed by 72.5 g of a 3% aqueous solution of $H_2O_2$ and 72.5 g of a 2% aqueous solution of VC were continuously fed over a period of 300 minutes for seeded polymerization. While the monomer solution was fed, the reaction temperature was kept at the range from 35° C. to 40° C.

| Core monomer mixture | |
| --- | --- |
| BA | 697.20 g |
| AlMA | 1.40 g |
| BGA | 1.40 g |

The reaction mixture was kept for one hour at the same temperature after finish of feeding monomers, and was subject to the shell polymerization.

32.9 g of a 3% aqueous solution of $H_2O_2$ and 32.9 g of VC was fed to the reaction mixture over a period of 150 minutes, and 431 g of a shell monomer emulsion of the under-mentioned composition was continuously fed over a period of 90 minutes for seeded polymerization. While the monomer solution was fed, the reaction temperature was kept at the range from 35° C. to 40° C.

| Shell monomer emulsion | |
| --- | --- |
| St | 240 g |
| AN | 60 g |
| Surfactant B | 47.0 g |
| DIW | 102.0 g |

The reaction mixture was kept for one hour at the same temperature, then, cooled and filtered through a 300-mesh stainless steel sieve to give a core-shell polymer latex.

This latex was frozen at −15° C. and filtered through a glass filter. The solid was then dried in a current of air at 60° C. overnight to give core-shell polymer D.

The compositions of core-shell polymers A to D are shown in Table 1.

EXAMPLE 5

Production of POM resin composition (1)

Seventy parts of Tenac C4510, a POM copolymer resin of Asahi Chemical Industry Co., Ltd., and 30 parts of core-shell polymer A prepared in Example 1 were dried to a moisture content of not more than 0.3% and using a twin-screw extruder (PCM-30; Ikegai Corporation), the mixture was melt-blended at a cylinder temperature of 200° C. and a die head temperature of 200° C. to give pellets of POM resin composition (1).

EXAMPLES 6 to 12

Production of POM resin compositions (2) to (8)

In the same manner as Example 5, pellets of POM resin compositions (2) to (8) were produced according to the formulas shown in Table 2.

COMPARATIVE EXAMPLES 1 and 2

Production of core-shell polymers E and F

In the same manner as Example 4, core-shell polymers E and F were produced according to the compositions shown in Table 1.

COMPARATIVE EXAMPLES 3 to 7

Production of POM resin compositions (9) to (13)

In the same manner as Example 5, pellets of POM compositions (9) to (13) were produced according to the formulas shown in Table 2.

Impact strength testing of resin products

Resin compositions (1) through (13) were dried at 110° C. for 1 hour and using an injection molding machine (TS-100, Nissei Plastics Co.), each composition was molded at a cylinder temperature of 200° C. and a nozzle temperature of 200° C.

Notched Izod testpieces, 3.2 mm thick, were prepared in accordance with JIS K7110. The impact strength of these testpieces were measured at 23° C. in accordance with JIS K7110.

Incidentally, melt-blending could not be made with POM resin compositions (10) and (11) (Comparative Examples 4 and 5). The results of blending are shown below in the table 2.

Determination of weld elongation retention rates of resin products

Using testpieces conforming to JIS k7113, the ratio of the elongation at break of a testpiece with two point gates at both ends to that of a testpiece with a one-point gate at one end was determined by the tensile test method according to JIS k7113. The results are set forth in the table 2.

WEATHERABILITY TEST

The color difference between non-exposed and exposed injection molded specimen obtained from POM resin compositions (5) and (13) by the Sunshine Super Long-Life Weather Meter® (Suga Test Instruments) were measured using Σ80 Color Measuring System® (Nippon Denshoku Kogyo).

The results are shown in Table 3.

THERMAL STABILITY TEST

The color difference between non-kept and kept injection molded specimen obtained from POM resin compositions (5) and (13) in the drier setting at 150° C. for 50 hours were measured using Σ80 Color Measuring System®.

The results are shown in Table 3.

THERMAL STABILITY TEST (KEPT MELTING)

The color difference between non-kept and kept injection molded specimen obtained from POM resin compositions (5) and (13) in the injection molding system setting the cylinder temperature of 230° C. before molding, were measured using **80 Color Measuring System®.

The results are shown in Table 3.

QUALITATIVE TEST FOR SULFATE ION

The sulfate ions in core-shell polymers A to E, KM-330 were determined.

Thus, 5 g of each sample was weighed into a 50 ml conical flask, 20 ml of deionized water was added and the mixture was stirred with a magnetic stirrer for 3 hours.

The mixture was filtered through a No. 5 C filter paper and the filtrate was divided into halves. Then, 0.5 ml of a 1% aqueous solution of barium chloride was added to one of the halves and the relative turbidity of the two halves was examined.

In this qualitative test, no sulfate ion was detected in core-shell polymers A to D but sulfate ions were detected in core-shell polymers E and KM-330.

TABLE 1

Compositions of Core-Shell Polymers

| Ex. No. | 1 | 2 | 3 | 4 | Comp. Ex. 1 | Comp. Ex. 2 |
|---|---|---|---|---|---|---|
| Impact Modifier | A | B | C | D | E | F |
| Core |  |  |  |  |  |  |
| BA | — | 60.76 | — | 66.234 | 79.68 | 69.51 |
| BGA | 0.007 | 0.1428 | 0.007 | 0.133 | 0.16 | 0.14 |
| AlMA | 0.018 | 0.357 | 0.018 | 0.133 | 0.16 | 0.35 |
| Bd | 28.1 | — | 28.1 | — | — | — |
| MMA | 13.05 | 7.0 | 13.05 | — | — | — |
| EA | 3.45 | 1.3832 | 3.45 | 3.5 | — | — |
| 2EHA | 25.2 | — | 25.2 | — | — | — |
| MAM | 0.12 | 0.357 | 0.12 | — | — | — |
| Core/MID//Shell | 70//30 | 70//30 | 70//30 | 70//30 | 80//20 | 70//30 |
| Shell |  |  |  |  |  |  |
| MMA | 27.0 | 27.0 | 27.0 | — | 18.0 | 27.0 |
| EA | 3.0 | 3.0 | 3.0 | — | 2.0 | 3.0 |
| BGA | 0.06 | — | 0.06 | — | — | — |
| AN | — | — | — | 6.0 | — | — |
| St | — | — | — | 24.0 | — | — |
| Surfactant | A | A | B | B | NP | OS |
| Polymerization Initiator | V50 | V50 | V50 | H2O2/VC | SPS | V50 |

TABLE 2

| Examples | 5 | 6 | 7 | 8 | 9 | 10 | 11 | 12 |
|---|---|---|---|---|---|---|---|---|
| Resin composition | (1) | (2) | (3) | (4) | (5) | (6) | (7) | (8) |
| Impact Modifier | (A) | (B) | (D) | (C) | (C) | (C) | (C) | (C) |
| Ratio of POM to Impact Modifier |  |  |  |  |  |  |  |  |
| POM-1 | 70 | 70 | 100 | 100 | 100 | 100 |  |  |
| POM-2 |  |  |  |  |  |  | 100 |  |
| POM-3 |  |  |  |  |  |  |  | 100 |
| Impact Modifier | 30 | 30 | 40 | 40 | 20 | 60 | 40 | 40 |
| Izod impact (kgf·cm/cm) | 31.2 | 18.0 | 14.8 | 33.9 | 22.1 | 38.2 | 41.6 | 35.1 |
| Elongation (%) (with weld/without weld) | 70/200 |  | 60/170 |  |  |  |  |  |

POM-1: Tenac C4510 (Asahi Chemical Industry Co., Ltd.; POM copolymer)
POM-2: Tenac C3510 (Asahi Chemical Industry Co., Ltd.; POM copolymer)
POM-3: Tenac 4010 (Asahi Chemical Industry Co., Ltd.; POM homopolymer)

| Examples | Comp. Ex. 3 | Comp. Ex. 4 | Comp. Ex. 5 | Comp. Ex. 6 | Comp. Ex. 7 |
|---|---|---|---|---|---|
| Resin composition | (9) | (10) | (11) | (12) | (13) |
| Impact Modifier | (E) | (F) | KM-330 | TPU | TPU |
| Ratio of POM-1 to Impact Modifier | 100/40 | 100/40 | 100/40 | 100/40 | 100/20 |
| Izod impact (kgf·cm/cm) | —* | —* | —* | 13.6 |  |
| Elongation (%) (with weld/without weld) | —* | —* | —* | 2.8/400 |  |

KM-330: impact modifier (Rohm & Haas Co.)
TPU: polyurethane elastomer; Elastollan ET-680-10 (Takeda Badische Urethane Industries, LTD.)
*The resin compositions (9) and (11) (Comparative Examples 3 and 5) foamed copiously owing to decomposition of POM during blending and could not be molded.
The resin composition (10) (Comparative Example 4) made smoke and had discolored during blending.

TABLE 3

| Resin compositions | (5) | (13) |
|---|---|---|
| Weatherability (ΔE) | 0.90 | 11.0 |
| Thermal stability (ΔE) | 3.5 | 12.1 |
| Thermal stability (kept melting) (ΔE) | 1.2 | 5.8 |

What is claimed is:

1. A method for producing a core-shell polymer comprising
a rubbery polymer core of a conjugated diene, an alkyl acrylate of 2 to 8 carbon atoms or a mixture thereof, the rubbery polymer having a glass transition temperature of not higher than −30° C., and
a glassy polymer shell of methyl methacrylate or a mixture of methyl methacrylate and at least one monomer copolymerizable therewith, the glassy polymer having a glass transition temperature of not lower than 60° C.,
said method comprising emulsion polymerization using (1) an oligomer surfactant of the formula

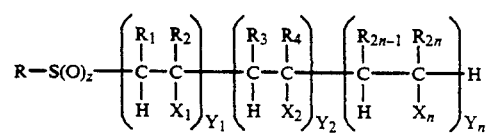

wherein
R is alkyl of 5 to 20 carbon atoms,
Z is 0, 1 or 2,
n is a positive integer $R_{2n-1}$ respectively is —H, —Ch₃, —C₂H₅ or —COOH,
$R_{2n}$ respectively is —H, —CH₃, —C₂H₅, —COOH or —CH₂COOH,
$X_n$ is —COOH, —CONH₂, —OCH₃, —OC₂H₅, —CH₂OH,
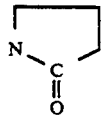
—COOC₂H₄OH, —COOC₃H₆OH, —CONHCH₂OH, —CONHCH₃, —CONHC₂H₅, —CONHC₃H₇, —COOCH₃, —COOC₂H₅, —CN, —OCOCH₃, —OCOC₂H₅, or
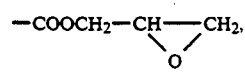
the molecular weight of said oligomeric surfactant being about 200 to 5000, and
(2) a neutral radicals-liberating polymerization initiator.
* * * * *

UNITED STATES PATENT AND TRADEMARK OFFICE
CERTIFICATE OF CORRECTION

PATENT NO. : 5,280,076
DATED : January 18, 1994
INVENTOR(S) : ICHIRO SASAKI, TAKAO TERAOKA and JUNJI OSHIMA It is certified that error appears in the above-indentified patent and that said Letters Patent is hereby corrected as shown below:

Column 3, lines 10 to 15, correct the formula to read:

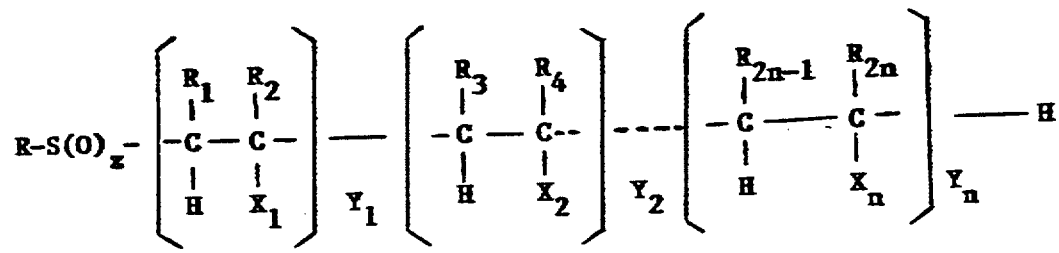

UNITED STATES PATENT AND TRADEMARK OFFICE
CERTIFICATE OF CORRECTION

PATENT NO. : 5,280,076
DATED : January 18, 1994
INVENTOR(S) : Ichiro Sasaki, Takao Teraoka and Junji Oshima It is certified that error appears in the above-indentified patent and that said Letters Patent is hereby corrected as shown below:

Column 14, lines 57 to 64, correct the formula to read:

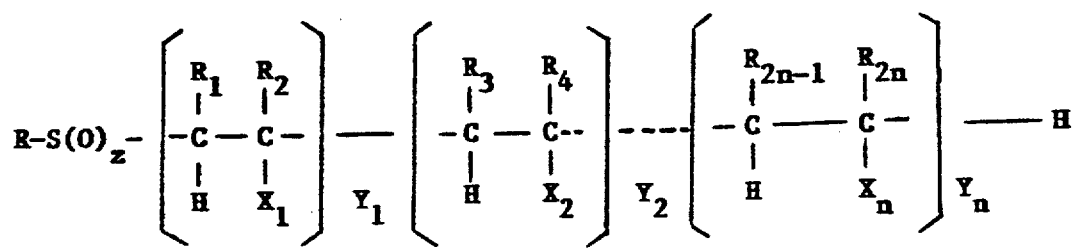

Signed and Sealed this

Sixteenth Day of August, 1994

*Attest:*

BRUCE LEHMAN

*Attesting Officer*   *Commissioner of Patents and Trademarks*